United States Patent [19]

Choate

[11] Patent Number: 4,567,551

[45] Date of Patent: Jan. 28, 1986

[54] MULTI-DIRECTIONAL SURFACE ILLUMINATOR

[75] Inventor: Albert G. Choate, Honeoye Falls, N.Y.

[73] Assignee: Automation Gages, Inc., Rochester, N.Y.

[21] Appl. No.: 583,626

[22] Filed: Feb. 27, 1984

[51] Int. Cl.$^4$ .............................................. G02B 21/10
[52] U.S. Cl. ...................................... 362/398; 362/32; 362/33; 362/97; 362/140; 362/235; 362/268; 362/305; 362/367; 350/525; 354/79
[58] Field of Search ................... 362/32, 33, 11, 398, 362/17, 97, 140, 253, 367, 235, 268, 305; 353/120; 350/523, 525; 354/79

[56] References Cited

U.S. PATENT DOCUMENTS

| Re. 22,848 | 3/1947 | Wilder | 362/235 |
|---|---|---|---|
| 3,064,523 | 11/1962 | Meltzer | 350/525 |
| 3,433,940 | 3/1969 | Baez | 362/27 |
| 4,006,487 | 2/1977 | Allen | 354/79 |
| 4,475,796 | 10/1984 | Kimura | 350/525 |

*Primary Examiner*—Donald P. Walsh
*Attorney, Agent, or Firm*—Shlesinger, Fitzsimmons & Shlesinger

[57] ABSTRACT

An annular Fresnel lens surrounds a tubular barrel or sleeve containing an objective lens system, which is focussed on an object that is positioned a predetermined distance beyond one end of the barrel. Four independently operable light sources are arranged in equi-angularly spaced relation around the outside of the lens barrel to direct light onto each of four mirrors, which are mounted in intersecting planes around the outside of the lens barrel to reflect light in four quadrants onto the side of the Fresnel lens remote from said object. The Fresnel lens focuses light from the mirrors obliquely onto the object, an image of which is thus projected by the objective lens through the lens barrel toward, for example, a video sensor, which forms part of a video inspection machine.

17 Claims, 4 Drawing Figures

MULTI-DIRECTIONAL SURFACE ILLUMINATOR

BACKGROUND OF THE INVENTION

This invention relates to surface illuminators, and more particularly to a dark field multi-directional surface illuminator of the type which is particularly suitable for illuminating objects that are being inspected by contour projectors, optical comparators, microscopes, and similar inspection systems.

Proper illumination of an object is most important when its image is to be magnified and observed by the lens system of a contour projector, optical comparator, microscope, or the like. There are many known devices for illuminating such objects, but one disadvantage is that for most such devices the illuminating light usually originates from a single source and is directed along a single path onto the object. Moreover, there frequently is an overlapping or at least partial coincidence of the path of light, which is used for illuminating the object, with the path of the image which is projected to the observer's eye, therefore creating at least some interference with the projected image.

When properly controlled, oblique illumination often enhances the edges of features on an observed object of the type described, particularly when the illuminating light is oriented in a direction most perpendicular to a respective edge. This has been found to be particularly true where it is possible to vary the intensity of the illuminating light.

Accordingly, it is an object of this invention to provide an improved, relatively inexpensive and extremely efficient multi-directional surface illuminator, which is designed to illuminate with variable intensity predetermined, selected surfaces on an object which is being observed in an inspection system of the type described.

Another object of this invention is to provide an illuminator of the type described which is of the dark field, multi-directional variety, and which is capable of illuminating selected surfaces of an object without interfering with the imaging path of the system.

A more specific object of this invention is to provide an improved multi-directional illuminator in which light from four individually controllable light sources is projected along four quadrants onto a single condenser lens, which focuses the light obliquely onto the surface of an object which is to be inspected.

Other objects of the invention will be apparent hereinafter from the specification and from the recital of the appended claims, particularly when read in conjunction with the accompanying drawings.

SUMMARY OF THE INVENTION

A generally truncated-pyramidal shaped lens housing has therethrough a central bore containing an objective lens barrel, which projects slightly beyond the smaller end of the housing and coaxially into the bore of an annular condenser lens (e.g. a Fresnel lens) the hub of which is releasably secured to the smaller end of the housing. Four trapezoidally shaped mirrors are secured on correspondingly shaped, intersecting plane surfaces, which are formed on the exterior of the lens housing adjacent its smaller end to be inclined to the axis of its bore and to the confronting surface of the Fresnel lens.

Each of four independently operable light sources is directed upon the surface of a different one of said mirrors, so that the light reflected from a respective mirror is directed onto one quadrant of the confronting surface of the Fresnel lens, which in turn causes the light passing therethrough to be compressed or focused obliquely onto an object positioned in the focal plane of this lens at the side thereof remote from the mirrors. The image of the thus illuminated object is then projected back through the objective lens and the bore in the lens housing toward an observer.

In practice the light from the four mirrors, which is focused onto the object by the Fresnel lens, is directed transversely of the image path of the object, and obliquely around the outside or perimeter of the object, so that it does not interfere with the light reflected from the object along the image axis to the observer. More importantly, each of the four different light sources, which if desired can be directed onto the associated mirror by means of fiber optic bundles, can be adjusted or controlled individually to vary its respective intensity and/or position.

Preferably the condenser lens is of the back-to-back two element Fresnel lens variety, which has an equal front and back focus distance. The object that is to be observed is placed in the focal plane of the Fresnel lens so that light from the individual light sources permits, in effect, selective enhancement of the edges of the object being observed.

THE DRAWINGS

DETAILED DESCRIPTION OF THE PREFERRED EMBODIMENTS

Figures 1, 2, 3, 4:
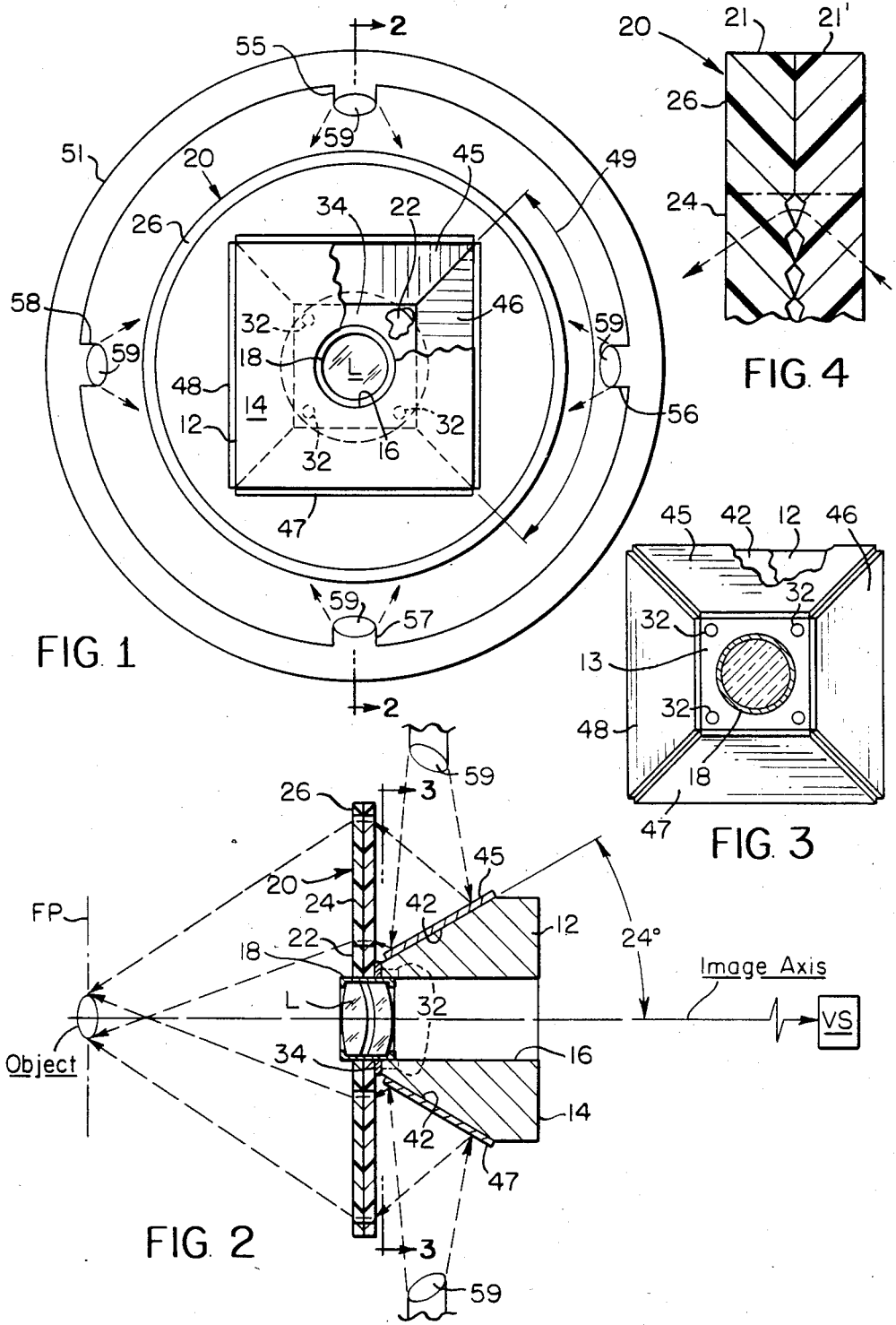
FIG. 1 is a front elevational view of a surface illuminator made according to one embodiment of this invention, portions of the objective lens housing of the illuminator being cut away in part.
FIG. 2 is a fragmentary sectional view taken generally along the line 2—2 in FIG. 1 looking in the direction of the arrows.
FIG. 3 is a sectional view taken generally along the line 3—3 in FIG. 2 looking in the direction of the arrows, but on a slightly smaller scale.
FIG. 4 is a much enlarged fragmentary view of the upper end of the Fresnel lens shown in FIG. 2.

Referring now to the drawings by numerals of reference, 12 denotes a generally truncated pyramidally shaped lens housing having spaced, parallel, inner and outer end surfaces 13 and 14, respectively, which are rectangular in configuration, and in the embodiment illustrated lie in vertical planes. Housing 12 has therethrough an axial bore 16 the axis of which is disposed centrally of the housing and at right angles to its end surfaces 13 and 14. Secured intermediate its ends in one end of the housing bore 16 coaxially thereof is a tubular lens barrel 18, which contains a conventional objective lens system denoted at L.

As shown more clearly in FIG. 2, the lens barrel 18 projects axially beyond the inner end surface 13 of the housing 12, and coaxially through the bore of an annular Fresnel lens, which is denoted generally in FIGS. 1 and 2 by the numeral 20. This lens, which may be made from plastic or glass, is of the back-to-back two element variety, comprising two identical elements 21, 21' (FIG. 4) having their grooved sides cemented together. Lens 20 has an annular hub section 22, which surrounds the projecting end of the lens barrel 18 coaxially thereof; a central, light-transmissive condensing section 24, which surrounds the hub section 22; and an outer peripheral section 26, which surrounds and encloses the condensing section 24 of the lens.

Lens 20 is releasably secured to the inner end surface 13 of housing 12 by means of four, rather small, cylindrical magnets 32, which are secured in corresponding recesses formed in the end surface 13 of housing 12 adjacent its four corners. The outer ends of magnets 32 are releasably attached by virtue of their associated magnetic fields to one side of a rectangularly shaped steel plate 34, which is glued or otherwise secured at its opposite side to the confronting face of the hub section 22 of lens 20.

Adjacent its inner end 13 housing 12 has formed on its outer surface four, intersecting, trapezoidally-shaped surfaces 42, each of which has one edge thereof defining one of the four edges of the rectangular end surface 13. Moreover, surfaces 42 are inclined to each other and to the axis of the housing bore 16 in such manner that the inner end of housing 12 is in essence, truncated pyrmidal in configuration, as best shown in FIG. 3. Each of the trapzoidally-shaped surfaces 42 has secured thereon one of four, similarly-shaped mirrors 45, 46, 47, and 48, the reflective surfaces of which face outwardly to direct light toward the adjacent surface of the Fresnel lens 20. In the embodiment illustrated, these mirrors lie in planes inclined at approximately 24° to the axis of the housing bore 16, and as shown diagramatically by line 49 in FIG. 1, each is disposed to have its reflective surface register with one of the four quadrants of the confronting surface of lens 20.

Mounted on frame 51 around the outside of the housing 12 are four, independently operable light sources 55, 56, 57 and 58, which are disposed in spaced, confronting relation with the reflective surfaces of mirrors 45, 46, 47 and 48, respectively. By way of example, each of these light sources may include a small fiber optic bundle 59 positioned to direct light, as shown for example by the broken lines and arrows in FIGS. 1 and 2, onto the reflective surfaces of the associated mirrors 45, 46, 47 and 48, respectively. These light beams, as shown more clearly in FIG. 2, are then reflected by the registering mirror surfaces onto the associated quadrants of the confronting compressor section 24 of the lens 20, which then focuses or compresses the light obliquely onto registering portions of the object which is positioned in the focal plane FP (FIG. 2) of lens 20.

As previously noted, each light source 55–58 is operable independently of the other so that the intensity, and if desired, the direction of the light eminating from that particular source can be adjusted as need be. The relfected light, which is focused on the object by the Fresnel lens 20, is then focused by the objective lens L so that an image of the illuminated object is projected along the axis of bore 16 in the direction of the arrow denoted as the image axis in FIG. 2. In a preferred form of the invention the image of the object is projected onto a video sensor VS (FIG. 2), which forms part of a video inspection machine that is utilized for inspecting and measuring complicated machine parts and the like.

One of the principal advantages of the above-described illuminator is that it employs a single compressing or Fresnel lens for directing light from four different sources obliquely onto an object positioned in the focal plane (FP) of the lens. Light is thus directed obliquely from the lens 20 onto the object so that it does not interfere with the light which is reflected from the object along the image axis toward the eye of the observer. Another advantage is that the intensity of each of the light sources 55–58 can be independently adjusted by any conventional means to direct light by virtue of the associated mirrors 45, 46, 47 or 48 onto one quadrant of the operating section 24 of the lens 20. In practice, therefore, there are four separate or independent beams of light which are direcred from the lens 20 toward the object, and with adjacent beams complimenting each other to the extent that they direct light onto adjacent quadrants of the object.

Each of the lens elements 21, 21' may, by way of example, be approximately 0.15" thick and have 0.02" spacing between the circular grooves in its grooved surface. Each may have its focal plane disposed approximated 3.6" from its plane side and infinity from its grooved side. The cemented lens 20 in the example illustrated may have an outside diameter of approximately 6.0", but the size of the lens 20 will obviously vary depending upon its intended use.

While it has been suggested that the above-noted illuminator is particularly suitable for use with a video inspection machine, it will be readily apparent that it could be used with a great variety of inspection and/or projection equipment, such as for example, conventional contour projectors, optical comparators, microscope systems and the like. Moreover, while only certain embodiments of the invention have been disclosed herein, it will be apparent that it is capable of still further modification, and that this application is intended to cover any such modifications as may fall within the scope of one skilled in the art, or the appended claims.

What is claimed is:

1. A multi-directional surface illuminator, comprising
    a housing,
    means mounted in a bore in said housing to project therethrough the image of an object located in a predetermined position beyond one end of said housing,
    a plurality of light sources arrayed around the outside of said housing,
    reflective means interposed between said sources and said housing and registering with said sources to reflect light therefrom away from said housing, and
    a condenser lens extending transversely of said housing bore with one side thereof confronting on said reflective means to receive therefrom light reflected from said sources, and with the other side thereof facing said predetermined position to focus light from said reflective means obliquely onto an object located in said predetermined position.

2. A multi-directional surface illuminator as defined in claim 1, wherein said light sources are operable independently of one another selectively to vary the intensity of the light directed onto said reflective means.

3. A multi-directional surface illuminator as defined in claim 1, wherein
    said condenser lens is an annular Fresnel lens disposed coaxially of the bore in said housing, and
    said reflective means comprises a plurality of reflective surfaces disposed in intersecting planes around the outside of said housing, and inclined to the axis of said bore and to the confronting side of said lens, and
    each of said reflective surfaces is disposed to direct reflected light onto a predetermined portion of said confronting side of said lens.

4. A multi-directional surface illumintor as defined in claim 3, wherein there are four of said reflective surfaces arrayed around the outside of said housing each to direct reflected light onto a different quadrant of said confronting side of said lens.

5. A multi-directional surface illuminator as defined in claim 4, wherein there are four of said light sources each of which directs light onto a different one of said reflective surfaces and each of said light sources is operable independently of the other sources of light.

6. A multi-directional surface illuminator as defined in claim 3, wherein said Fresnel lens comprises two, identical, annular lenses each having on one side a plane surface and in its opposite side a plurality of concentrically disposed circular grooves, said elements having their grooved sides secured together in confronting, coaxial relation.

7. A multi-directional surface illuminator as defined in claim 1, wherein
said means for projecting said image through said bore comprises an objective lens mounted on said housing with its image axis disposed coaxially of said bore, and
said condenser lens is circular in configuration and has therethrough an axial bore registering coaxially with said objective lens and the bore in said housing, whereby the light focused by said condenser lens onto an object in said predetermined position travels in directions transversely of said image axis.

8. A multi-directional surface illuminator as defined in claim 7, including
means mounting said light sources around the outside of said housing in spaced relation to each other and to said housing, and to direct light therefrom toward said housing,
said reflective means comprising a plurality of mirror elements equal in number to said light sources and mounted on said housing with their reflective surfaces inclined to and registering with said light sources and predetermined portions of said one side of said condenser lens.

9. A multi-directional surface illuminator as defined in claim 8, wherein said mirror elements are secured on a plurality of intersecting, plane surfaces formed on the outside of said housing adjacent said one end thereof.

10. A multi-directional surface illuminator as defined in claim 9, wherein said mirror elements are trapezoidally shaped in configuration and are positioned on said housing each to direct reflected light onto one quadrant of said one side of said condenser lens.

11. A multi-directional surface illuminator as defined in claim 7, including means releasably securing said lens to said one end of said housing to lie in a plane extending at right angles to the axis of the bore in said housing.

12. A multi-directional surface illuminator as defined in claim 11, wherein the last-named means comprises a metal plate secured to said one side of said lens and having therethrough a central opening registering with the bore in said lens, and a plurality of magnets mounted in said one end of said housing releasably to retain said metal plate against said one end of the housing coaxially of its bore.

13. A multi-directional surface illuminator, comprising
a sleeve containing an objective lens for projecting through the sleeve the image of an object located in a predetermined position beyond one end of said sleeve,
an annular condenser lens surrounding said sleeve coaxially thereof and having one side thereof facing in the direction of said predetermined position, and
means including a plurality of independently operable light sources for directing light onto the opposite side of said condenser lens,
said means further including a plurality of reflective surfaces arrayed around the outside of said sleeve adjacent said opposite side of said condenser lens and positioned to reflect light from said sources obliquely onto said opposite side of said condenser lens to be focused thereby obliquely onto an object lcoated in said predetermined position.

14. A multi-directional surface illuminator as defined in claim 13, wherein each of said reflective surfaces registers with one of said light sources and with a predetermined angular sector of said opposite side of said condenser lens.

15. A multi-directional surface illuminator as defined in claim 14, wherein each of said reflective surfaces is trapezoidal in configuration and is positioned in a plane which is inclined to the axis of said sleeve and which intersects the planes of the reflective surfaces adjacent thereto.

16. A multi-directional surface illuminator as defined in claim 15, wherein there are four of said reflective surfaces, and each of said surfaces directs reflected light onto one quadrant of said opposite side of said condenser lens.

17. A multi-directional surface illuminator as defined in claim 16, wherein said condenser lens is a Fresnel lens.

* * * * *